US012180682B2

(12) United States Patent
Nakajima et al.

(10) Patent No.: US 12,180,682 B2
(45) Date of Patent: Dec. 31, 2024

(54) HYDRAULIC CONTROL SYSTEM

(71) Applicant: Caterpillar SARL, Geneva (CH)

(72) Inventors: Hideki Nakajima, Akashi (JP); Koichi Kiyasu, Akashi (JP)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 18/276,305

(22) PCT Filed: Feb. 3, 2022

(86) PCT No.: PCT/EP2022/025036
§ 371 (c)(1),
(2) Date: Aug. 8, 2023

(87) PCT Pub. No.: WO2022/167151
PCT Pub. Date: Aug. 11, 2022

(65) Prior Publication Data
US 2024/0117601 A1 Apr. 11, 2024

(30) Foreign Application Priority Data
Feb. 8, 2021 (JP) ................................ 2021-018075

(51) Int. Cl.
*E02F 9/22* (2006.01)
*F15B 11/17* (2006.01)

(52) U.S. Cl.
CPC .......... *E02F 9/2242* (2013.01); *E02F 9/2235* (2013.01); *F15B 11/17* (2013.01); (Continued)

(58) Field of Classification Search
CPC ... E02F 9/2235; E02F 9/2242; F15B 11/0426; F15B 2211/253; F15B 2211/3144; F15B 2211/329
See application file for complete search history.

(56) References Cited

U.S. PATENT DOCUMENTS 5,829,252 A * 11/1998 Hirata .................. E02F 9/2242 60/429
5,852,934 A * 12/1998 Chung .................. E02F 9/2292 91/461
(Continued)

FOREIGN PATENT DOCUMENTS

EP 3660330 A1 6/2020
JP H09079212 A 3/1997
(Continued)

OTHER PUBLICATIONS

JP2017020604A machine translation (Year: 2017).*
(Continued)

*Primary Examiner* — David E Sosnowski
*Assistant Examiner* — Matthew Wiblin

(57) ABSTRACT

To avoid a large size of a direction change-over valve and enable accurate supply flow control when providing a flow control valve at an upstream side of the direction change-over valve to change the relationship between supply flow rate and discharge flow rate for a hydraulic actuator. The configuration is to control a supply flow rate to a stick cylinder based on an opening area of the stick's direction change-over valve and stick's flow control valve, calculate a target opening area of the stick's flow control valve based on a target supply flow rate from hydraulic pumps A, B to the stick cylinder, the opening area of the stick's direction change-over valve, and a target differential pressure between hydraulic pump A and a load pressure of stick cylinder, and control the stick's flow control valve so as to keep the target opening area calculated.

4 Claims, 5 Drawing Sheets

(52) U.S. Cl.
CPC . *F15B 2211/253* (2013.01); *F15B 2211/3144* (2013.01); *F15B 2211/329* (2013.01); *F15B 2211/41509* (2013.01)

(56) References Cited

U.S. PATENT DOCUMENTS

| | | | | |
|---|---|---|---|---|
| 6,244,048 | B1 * | 6/2001 | Tanaka | E02F 9/2242 91/454 |
| 10,995,474 | B2 * | 5/2021 | Takahashi | E02F 9/2235 |
| 2011/0056192 | A1 * | 3/2011 | Weber | E02F 9/2292 60/428 |

FOREIGN PATENT DOCUMENTS

| | | | |
|---|---|---|---|
| JP | 2017020604 | A | 1/2017 |
| JP | 2019173880 | A | 10/2019 |

OTHER PUBLICATIONS

International Search Report related to Application No. PCT/EP2022/025036; reported on Jun. 3, 2022.
Japanese Office Action for Japan Patent Appln. No. 2021-018075, mailed Oct. 17, 2024 (5 pgs).

* cited by examiner

HYDRAULIC CONTROL SYSTEM

CROSS-REFERENCE TO RELATED APPLICATION

This application is a USC 0 371 US National Stage filing International Application No. PCT/EP2022/025036 filed on Feb. 3, 2022 which claims priority under the Paris Convention to Japanese Patent Application 2021-018075 filed on Feb. 8, 2021.

TECHNICAL FIELD

The present invention relates to a technical field of hydraulic control system used in working machines with hydraulic actuators such as a hydraulic shovel.

BACKGROUND ART

In general, working machines such as the hydraulic shovel are provided with various types of hydraulic actuators; as a hydraulic control system for controlling an oil supply/discharge of these hydraulic actuators, for example, a configuration is well known conventionally which has a single spool valve for simultaneously performing a direction change-over control to change over supply/discharge directions of hydraulic oil for a hydraulic actuator, a supply flow control to control a supply flow rate from a hydraulic pump to the hydraulic actuator, and a discharge flow control to control a discharge flow rate from the hydraulic actuator to an oil tank. However, when the single spool valve controls the supply/discharge flow rates, since a relationship of supply side's opening area and discharge side's opening area relative to the spool's moved position are uniquely determined, a problem of degraded working efficiency and operability arises that cannot change the relationship between the supply flow rate and discharge flow rate depending on operating states, for example, such as an individual operation actuating a single hydraulic actuator alone and a combined operation actuating multiple hydraulic actuators at the same time, or various works such as a light load work and a heavy load work.

For coping this problem, there is a conventional technology for controlling the supply flow rate to and discharge flow rate from the hydraulic actuator independently of one another which is provided with a flow control valve for controlling the supply flow rate from the hydraulic pump to the hydraulic actuator, a direction change-over valve arranged at a downstream side of the flow control valve for changing over the supply/discharge directions of hydraulic oil against the hydraulic actuator and controlling the discharge flow rate from the hydraulic actuator, and a control means for controlling these flow control valve and direction change-over valve (see PTL 1, for example). As for this technology, the direction change-over valve is configured not to control the supply flow rate by setting up a large opening area of a supply valve passage formed on the direction change-over valve so that the supply flow runs as-is into the hydraulic actuator, and this enables each individual valve to control the supply/discharge flow rates to/from the hydraulic actuator independently of one another and reduces the number of parts by providing the direction change-over valve with two functions of supply/discharge change-over control and discharge flow control, in comparison with a configuration which uses three different valves to control the direction change-over, supply flow rate, and discharge flow rate.

Moreover, in PTL 1 mentioned above, a large flow rate hydraulic actuator using first and second hydraulic pumps as a hydraulic supply source is configured to be provided with two flow control valves, first one controlling the supply flow rate from first hydraulic pump and second one controlling the supply flow rate from second hydraulic pump, and supply total flow rate from two flow control valves pumps through the supply valve passage formed on the direction change-over valve for direction change-over and discharge flow controls to the hydraulic actuator. Thus, this enables even the large flow rate hydraulic actuator where pressurized oil is supplied from two hydraulic pumps to control the supply/discharge flow rates individually, require only a single direction change-over valve, so that its circuit can be simplified, the supply flow rates from first and second hydraulic pumps can be controlled individually, and a pump flow rate distribution can be controlled at a high precision during the combined operation.

PRIOR ART LITERATURES

Patent Literatures

PTL 1: Japanese Unexamined Patent Application Publication No. 2017-20604.

SUMMARY OF THE INVENTION

Problems to be Solved by the Invention

In the PTL 1, the direction change-over valve is configured to run the supply flow as-is controlled by the flow control valve to the hydraulic actuator, as mentioned above; that is, the direction change-over valve is configured not to control the supply flow rate. Here, the supply flow rate to the hydraulic actuator can be controlled only with the opening area control of the flow control valve by making the opening area of the supply valve passage to the direction change-over valve so large that there is no difference of pressure before and after the valve. However, the size of the direction change-over valve must be set large in order to form a valve passage with such a large opening, and especially, as for the direction change-over valve for large flow rate hydraulic actuator using two hydraulic pumps as hydraulic supply source, a supply valve passage with the large opening is required for letting the supply flow from two hydraulic pumps pass without any difference of pressure before and after the direction change-over valve, so that a problem arises that the direction change-over valve becomes considerably large. So, it has been proposed to provide the flow control valve at an upstream side of the direction change-over valve without making the opening area of the supply valve passage to the direction change-over valve so large as there is no difference of pressure before and after the valve. But, not only the opening area of the flow control valve but the opening area of the supply valve passage to the direction change-over valve may affect the flow control and may make the supply flow control to the hydraulic actuator difficult, so this is a problem to be solved by this invention.

Means for Solving the Problems

This invention is created for the purpose of solving the problems in consideration of current condition mentioned above; a claim 1 of this invention is a hydraulic control system comprising a hydraulic pump and a hydraulic actuator using the hydraulic pump as a hydraulic supply source, wherein the system is provided with a direction change-over valve having supply/discharge valve passages for the hydraulic actuator and changing over supply/discharge directions, a flow control valve arranged at an upstream side of the direction change-over valve for controlling a supply flow rate from the hydraulic pump to the direction change-over valve, and a control means for controlling an operation of the direction change-over valve and the flow control valve; a discharge flow rate for the hydraulic actuator is configured to be controlled based on an opening area of the discharge valve passage from the direction change-over valve, and a supply flow rate is configured to be controlled based on an opening area of the supply valve passage to the direction change-over valve and an opening area of the flow control valve; wherein the control means comprises: a target supply flow rate setting means to set up a target supply flow rate from the hydraulic pump to the hydraulic actuator depending on an operating amount of hydraulic actuator's manipulator; a direction change-over valve's opening area setting means to set up the opening area of the supply/discharge valve passages for the direction change-over valve depending on the operating amount of hydraulic actuator's manipulator; a target differential pressure setting means to set up a target differential pressure between hydraulic pump pressure and load pressure of hydraulic actuator; and a calculation means to calculate a target opening area of the flow control valve for supplying the target supply flow rate to the hydraulic actuator based on the target supply flow rate preset above, the opening area of the supply valve passage to the direction change-over valve, and the target differential pressure; and wherein the control means controls an operation of the flow control valve so as to keep the target opening area calculated by the calculation means.

The claim 2 of this invention is the hydraulic control system as claimed in claim 1, wherein when calculating the target opening area of the flow control valve, the calculation means calculates a differential pressure before and after the supply valve passage to the direction change-over valve based on the target supply flow rate and the opening area of the supply valve passage to the direction change-over valve, further calculates a differential pressure before and after the flow control valve based on the differential pressure before and after the supply valve passage to the direction change-over valve and target differential pressure, and calculates a target opening area of the flow control valve based on the differential pressure before and after the flow control valve and the target supply flow rate.

The claim 3 of this invention is the hydraulic control system as claimed in claim 1, wherein the hydraulic control system comprises: first and second hydraulic pumps; a large flow hydraulic actuator using both first and second hydraulic pumps as the hydraulic supply source; the direction change-over valve having supply/discharge valve passages for the large flow hydraulic actuator and changing over supply/discharge directions; main side/subside supply oil passages respectively connecting first and second hydraulic pumps to a pump port of the direction change-over valve; wherein the system arranges the flow control valve for controlling the supply flow rate from the second hydraulic pump to the direction change-over valve at the subside supply oil passage; when an operating amount of the large flow hydraulic actuator's manipulator is less than a setting value, only the supply flow passing through the main side supply oil passage is configured to be supplied from first hydraulic pump to the direction change-over valve by closing the flow control valve; when the operating amount of the large flow hydraulic actuator's manipulator is not less than the setting value, the supply flow passing through the subside supply oil passage from the second hydraulic pump and the supply flow passing through the main side supply oil passage from the first hydraulic pump are configured to be joined together to be supplied to the direction change-over valve by opening the flow control valve; wherein the discharge flow rate for the large flow hydraulic actuator is configured to be controlled based on the opening area of the discharge valve passage from the direction change-over valve; if the flow control valve is closed, the supply flow rate is configured to be controlled based on the opening area of the supply valve passage to the direction change-over valve; and if the flow control valve is opened, the supply flow rate is configured to be controlled based on the opening area of the flow control valve and the opening area of the supply valve passage to the direction change-over valve; wherein the target supply flow rate setting means provided to the control means sets up the target supply flow rate supplied from the first and second hydraulic pumps respectively to the large flow hydraulic actuator for each of the hydraulic pumps depending on the operating amount of the large flow hydraulic actuator's manipulator; the direction change-over valve's opening area setting means sets up the opening area of the supply/discharge valve passages for the direction change-over valve depending on the operating amount of the large flow hydraulic actuator's manipulator; the target differential pressure setting means sets up the target differential pressure between the second hydraulic pump pressure and the load pressure of the large flow hydraulic actuator; and the calculation means calculates the target opening area of the flow control valve for supplying the target supply flow rate from the second hydraulic pump to the large flow hydraulic actuator based on the target supply flow rate preset above, the opening area of the supply valve passage to the direction change-over valve, and the target differential pressure.

The claim 4 of this invention is the hydraulic control system as claimed in claim 3, wherein when calculating the target opening area of the flow control valve, the calculation means calculates the differential pressure before and after the supply valve passage to the direction change-over valve based on the target supply flow rate from the first and second hydraulic pumps to the hydraulic actuator and the opening area of the supply valve passage to the direction change-over valve, further calculates the differential pressure before and after the flow control valve based on the differential pressure before and after the supply valve passage to the direction change-over valve and the target differential pressure, and calculates the target opening area of the flow control valve based on the differential pressure before and after the flow control valve and the target supply flow rate from the second hydraulic pump to the hydraulic actuator.

Favorable Effects of the Invention

According to the invention of claim 1, the direction change-over valve can be avoided from becoming larger and provide highly accurate supply flow control, although the relationship between supply flow rate to and discharge flow rate from the hydraulic actuator can be changed.

According to the invention of claim 2, the target opening area of the flow control valve can be calculated accurately, helping to improve an accuracy of the supply flow control.

According to the invention of claim 3, also in the large flow hydraulic actuator using first and second hydraulic pumps as hydraulic supply source, the direction change-over valve can be avoided from becoming larger and provide highly accurate supply flow control, although the relationship between supply flow rate to and discharge flow rate from the large flow hydraulic actuator can be changed in the wide area of the supply flow rate where pressurized oil is supplied from the both hydraulic pumps.

According to the invention of claim 4, the target opening area of the flow control valve for large flow hydraulic actuator can be calculated accurately, helping to improve the accuracy of the supply flow control.

DETAILED DESCRIPTION OF THE INVENTION

Now, an explanation is provided below about an embodiment of the present invention based on drawings.

Figure 1:
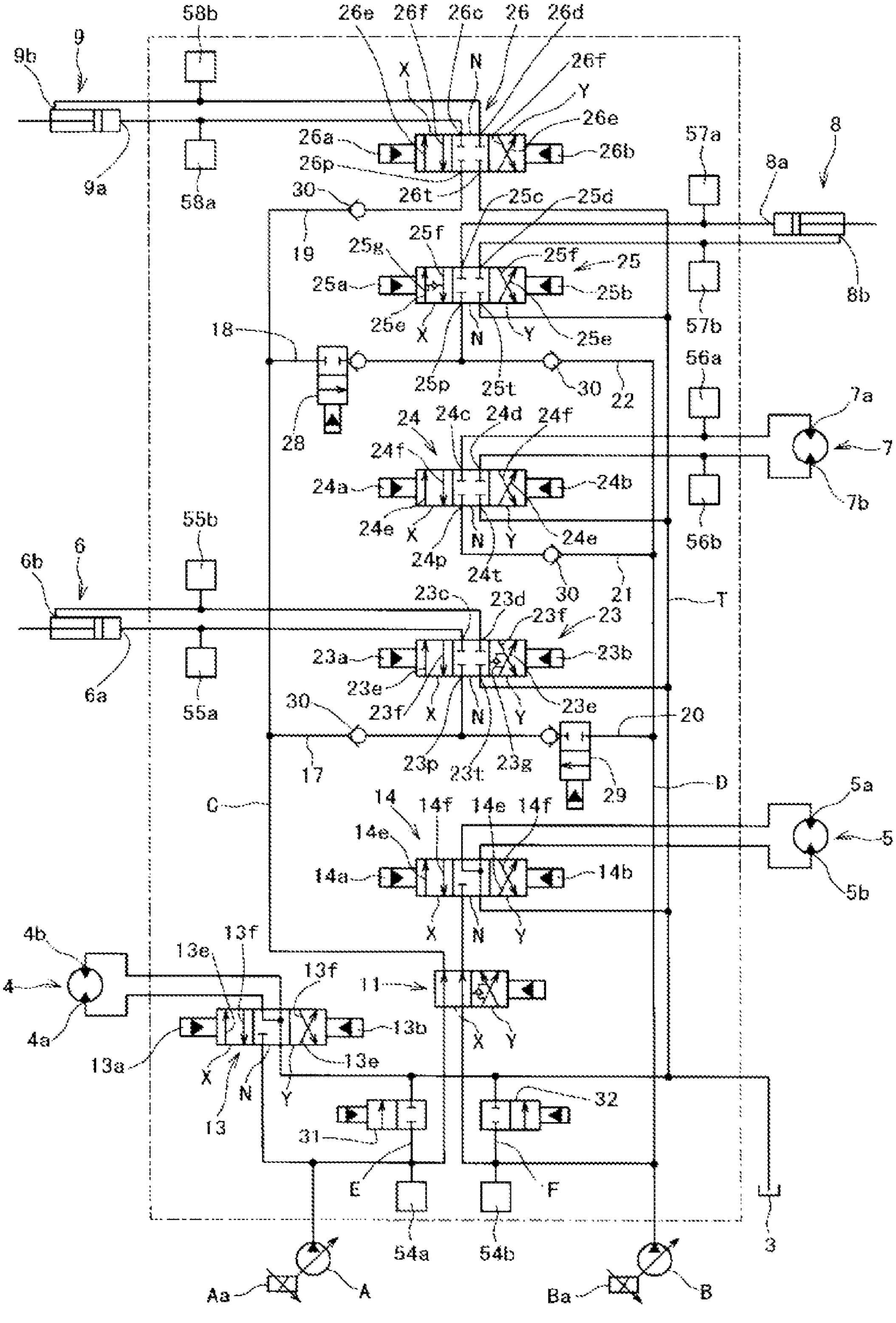
FIG. 1 is a hydraulic circuit diagram illustrating a first embodiment.

First of all, FIG. 1 is the hydraulic circuit diagram illustrating the first embodiment of the hydraulic control system of hydraulic shovel where this invention has been implemented; in the FIG. 1, signs A, B indicate capacity variable hydraulic pumps, signs Aa, Ba indicate variable capacity means changing over a volume of hydraulic pumps A, B based on a control signal transmitted from controller 10 mentioned later, the sign 3 indicates an oil tank, the sign 4 indicates a left traveling motor, the sign 5 indicates a right traveling motor, the sign 6 indicates a boom cylinder, the sign 7 indicates a swiveling motor, the sign 8 indicates a stick cylinder, and the sign 9 indicates a bucket cylinder. The left/right traveling motors 4, 5, boom cylinder 6, swiveling motor 7, stick cylinder 8, and bucket cylinder 9 mentioned above are hydraulic actuator using hydraulic pumps A, B as hydraulic supply source; of these hydraulic actuators, the boom/stick cylinders 6, 8 are hydraulic actuator using both hydraulic pumps A, B as hydraulic supply source and correspond to the large flow hydraulic actuator of this invention. Note that the boom cylinder 6, stick cylinder 8, and bucket cylinder 9 are hydraulic cylinder extending and contracting to swing a boom, stick, and bucket (all not shown) respectively composing a front work equipment of hydraulic shovel; the left/right traveling motors 4, 5 are hydraulic motor working to drive left and right traveling bodies of hydraulic shovel forward and backward respectively; and the swiveling motor 7 is the hydraulic motor working to swivel an upper swiveling body of hydraulic shovel left and right.

The hydraulic pump A is connected to a pump line C via straight travel valve 11 at first position X mentioned later as well as left travel direction change-over valve 13. Also, the hydraulic pump B is connected to a pump line D as well as right travel direction change-over valve 14 via the straight travel valve 11 at the first position X.

The straight travel valve 11 is a two-way changeover valve changing over first and second positions X, Y based on the control signal output from the controller 10; wherein, in a condition that the straight travel valve 11 is positioned at first position X, delivery oil of the hydraulic pump A is to be supplied to the pump line C and left travel direction change-over valve 13 and the delivery oil of the hydraulic pump B is supplied to the pump line D and right travel direction change-over valve 14; and in the condition that straight travel valve 11 is positioned at the second position Y, the delivery oil of hydraulic pump A is to be supplied to both left and right travel direction change-over valves 13, 14 and the delivery oil of the hydraulic pump B is supplied to the both pump lines C, D. The controller 10 is to set supply flow rates to the left/right traveling motors 4, 5 to the same rate during straight travel by changing over the straight travel valve 11 to the first position X and second position Y depending on the operation of left and right travel manipulator (not shown) or other hydraulic actuator's manipulator (for boom, swiveling, stick, and bucket, all not shown). Note that, the explanation is provided below about the case where the straight travel valve 11 is positioned at the first position X, that is, where the delivery oil from hydraulic pump A is supplied to pump line C and left travel direction change-over valve 13 and the delivery oil from hydraulic pump B is supplied to pump line D and right travel direction change-over valve 14.

The left and right travel direction change-over valves 13, 14 are a closed center spool valve controlling the supply/discharge flow rates for left/right traveling motors 4, 5 as well as changing over the supply/discharge directions, and comprise forward side/backward side pilot ports 13*a*, 13*b*, 14*a*, and 14*b* connected to traveling proportional solenoid valves (left travel forward side/left travel backward side/right travel forward side/right travel backward side proportional solenoid valves, all not shown) for outputting a pilot pressure based on the control signal output from the controller 10. When the pilot pressure is not input into the forward side/backward side pilot ports 13*a*, 13*b*, 14*a*, and 14*b*, the left and right travel direction change-over valves 13, 14 are positioned at a neutral position N where oil is neither supplied to nor discharged from the left/right traveling motors 4, 5; when the pilot pressure is input into the forward side pilot ports 13*a*, 14*a*, the left and right travel direction change-over valves 13, 14 are configured to be changed over to a forward operating position X to open supply valve passages 13*e*, 14*e* to supply the delivery oil from hydraulic pumps A, B to forward side ports 4*a*, 5*a* on the left/right traveling motors 4, 5 as well as open the discharge valve passages 13*f*, 14*f* to discharge oil from backward side ports 4*b*, 5*b* to oil tank 3; also when the pilot pressure is input into the backward side pilot ports 13*b*, 14*b*, the valves 13, 14 are configured to be changed over to a backward operating position Y to open the supply valve passages 13*e*, 14*e* to supply the delivery oil from hydraulic pumps A, B to the backward side ports 4*b*, 5*b* on the left/right traveling motors 4, 5 as well as open the discharge valve passages 13*f*, 14*f* to discharge oil from the forward side ports 4*a*, 5*a* to the oil tank 3. When the valves 13, 14 are positioned at forward or backward operating position X or Y, the supply and discharge flow rates for the left/right traveling motors 4, 5 are to be controlled by the opening area of supply valve passages 13*e*, 14*e* and discharge valve passages 13*f*, 14*f* and the opening area is to controlled to be increased or decreased depending on the spool move position associated with an increase or decrease of pilot pressure output from the travel proportional solenoid valve to the forward side/backward side pilot ports 13*a*, 13*b*, 14*a*, and 14*b*. Also, when the left and right travel manipulators are operated, the controller 10 is to control the travel proportional solenoid valves to output the pilot pressure which increases or decreases depending on the operating amount of the travel manipulators, thus enabling to drive left and right traveling motors 4, 5 at a rate corresponding to the operating amount of the travel manipulators.

Also, boom's main side supply oil passage 17, stick's subside supply oil passage 18, and bucket's supply oil passage 19 are branched in parallel to each other from the pump line C connected to the hydraulic pump A; also, boom's subside supply oil passage 20, swiveling's supply oil passage 21, and stick's main side supply oil passage 22 are branched in parallel to each other from the pump line D connected to the hydraulic pump B. The boom's main side supply oil passage 17 and boom's subside supply oil passage 20 are the oil passages connecting hydraulic pumps A, B respectively to the pump port 23*p* on the boom's direction change-over valve 23 mentioned later; also the stick's main side supply oil passage 22 and stick's subside supply oil passage 18 are the oil passages connecting hydraulic pumps B, A respectively to the pump port 25*p* on the stick's direction change-over valve 25; swiveling's supply oil passage 21 is the oil passage connecting hydraulic pump B to the pump port 24*p* on the swiveling's direction change-over valve 24; and bucket's supply oil passage 19 is the oil passage connecting hydraulic pump A to the pump port 26*p* on the bucket's direction change-over valve 26.

The stick's flow control valve 28 is disposed on the stick's subside supply oil passage 18 for controlling the supply flow rate from the hydraulic pump A to the stick's direction change-over valve 25; also the boom's flow control valve 29 is disposed on the boom's subside supply oil passage 20 for controlling the supply flow rate from the hydraulic pump B to the boom's direction change-over valve 23. These stick's/boom's flow control valves 28, 29 are a poppet valve pilot operated by the stick's/boom's flow control proportional solenoid valves 45, 46 (shown in FIG. 2) working based on the control signal output from the controller 10 for the flow control, and have a back flow prevention function for allowing an oil flow from hydraulic pumps A, B to the stick's/boom's direction change-over valves 25, 23 and preventing a back flow.

Also, the flow control valve such as the stick's/boom's flow control valves 28, 29 is not disposed on the boom's/stick's main side supply oil passages 17, 22 and bucket's/swiveling's supply oil passages 19, 21; the supply flow passing through these boom's/stick's main side supply oil passages 17, 22 and bucket's/swiveling's supply oil passages 19, 21 from hydraulic pump A or B is to be supplied as-is to the direction change-over valves 23, 26, 24, 25 for boom, bucket, swiveling, and stick without controlling the flow rate. The check valve 30 is disposed on each of the boom's/stick's main side supply oil passages 17, 22 and bucket's/swiveling's supply oil passages 19, 21, and is to allow the oil flow from the hydraulic pumps A, B to the direction change-over valves 23, 26, 24, 25 for boom, bucket, swiveling, and stick and prevent the back flow.

Thus, the pressurized oil is to be supplied to the pump port 23*p* on the boom's direction change-over valve 23 through the boom's main side/subside supply oil passages 17, 20 respectively from hydraulic pumps A, B; and the flow rate of the pressurized oil from hydraulic pump B is to be controlled (or interrupted) by the boom's flow control valve 29 disposed on the boom's subside supply oil passage 20 to be supplied to the boom's direction change-over valve 23. Also, the pressurized oil from hydraulic pumps B, A is to be supplied to the pump port 25*p* on the stick's direction change-over valve 25 through the stick's main side and subside supply oil passages 22, 18 respectively; and the flow rate of the pressurized oil from hydraulic pump A is to be controlled (or interrupted) by the stick's flow control valve 28 disposed on the stick's subside supply oil passage 18 to be supplied to the stick's direction change-over valve 25.

Next, the explanation is provided about the direction change-over valves 23 to 26 for boom, swiveling, stick, and bucket.

The explanation is provided about the swiveling's/bucket's direction change-over valves 24, 26 where the pressurized oil is supplied from either one of hydraulic pumps A, B. The swiveling's direction change-over valve 24 is the closed center spool valve for controlling the supply/discharge flow rates of swiveling motor 7 as well as changing over its supply/discharge directions; and the valve 24 has left/right turning pilot ports 24*a*, 24*b* respectively connected to swiveling's left/right turning proportional solenoid valves 42*a*, 42*b* (shown in FIG. 2) for outputting the pilot pressure based on the control signal output from controller 10, a pump port 24*p* connected to the swiveling's supply oil passage 21, a tank port 24*t* connected to a tank line T to the oil tank 3, first actuator port 24*c* connected to left turning port 7*a* on the swiveling motor 7, and second actuator port 24*d* connected to right turning port 7*b* on the swiveling motor 7. Also, when no pilot pressure is input into both left/right turning pilot ports 24*a*, 24*b*, the swiveling's direction change-over valve 24 is positioned at neutral position N where the supply/discharge of swiveling motor 7 is not controlled; when the pilot pressure is input into the left turning pilot port 24*a*, the valve 24 is configured to be changed over to a left turning operating position X to open the supply valve passage 24*e* from the pump port 24*p* to first actuator port 24*c* and discharge valve passage 24*f* from second actuator port 24*d* to the tank port 24*t*; also when the pilot pressure is input into the right turning pilot port 24*b*, the valve 24 is configured to be changed over to a right turning operating position Y to open the supply valve passage 24*e* from the pump port 24*p* to second actuator port 24*d* and discharge valve passage 24*f* from first actuator port 24*c* to the tank port 24*t*. When the valve 24 is positioned at left/right turning operating position X or Y, the supply/discharge flow rates for the swiveling motor 7 are to be controlled by the opening area of supply/discharge valve passages 24*e*, 24*f*, and the opening area is controlled to be increased or decreased depending on the spool move position associated with the increase or decrease of pilot pressure output from the swiveling's left/right turning proportional solenoid valves 42*a*, 42*b* to the left/right turning pilot ports 24*a*, 24*b*.

The bucket's direction change-over valve 26 is the closed center spool valve for controlling the supply/discharge flow rates of bucket cylinder 9 as well as changing over the supply/discharge directions; and the valve 26 has extended side/contracted side pilot ports 26*a*, 26*b* respectively connected to bucket's extended side/contracted side proportional solenoid valves 44*a*, 44*b* (shown in FIG. 2) for outputting the pilot pressure based on the control signal output from controller 10, a pump port 26*p* connected to the bucket's supply oil passage 19, a tank port 26*t* connected to the tank line T, first actuator port 26*c* connected to head side port 9*a* on the bucket cylinder 9, and second actuator port 26*d* connected to rod side port 9*b* on the bucket cylinder 9. The bucket's direction change-over valve 26 has the same structure as the swiveling's direction change-over valve 24 mentioned above; when the valve 26 changes over from neutral position N to extended/contracted operating positions X, Y, the valve 26 is configured to open the supply valve passage 26_e_ from pump port 26_p_ to actuator port 26_c_ or 26_d_ and the discharge valve passage 26_f_ from the actuator port 26_d_ or 26_c_ to tank port 26_t_ and control the supply/discharge flow rates depending on the opening area of the supply/discharge valve passages 26_e_, 26_f_ to/from bucket cylinder 9; and the opening area is controlled to be increased or decreased depending on the spool move position according to the increase or decrease of the pilot pressure output from the bucket's extended side/contracted side proportional solenoid valves 44_a_, 44_b_.

Next, the explanation is provided about the stick's/boom's direction change-over valves 25, 23 where the pressurized oil is supplied from both hydraulic pumps A, B. The stick's direction change-over valve 25 is the closed center spool valve for controlling the supply/discharge/recycle flow rates of stick cylinder 8 as well as changing over the supply/discharge directions; and the valve 25 has extended side/contracted side pilot ports 25_a_, 25_b_ respectively connected to the stick's extended side/contracted side proportional solenoid valves 43_a_, 43_b_ (shown in FIG. 2) for outputting the pilot pressure based on the control signal output from controller 10, the pump port 25_p_ connected to the stick's main side/subside supply oil passages 22, 18, the tank port 25_t_ connected to the tank line T, first actuator port 25_c_ connected to head side port 8_a_ on the stick cylinder 8, and second actuator port 25_d_ connected to rod side port 8_b_ on the stick cylinder 8. Also, when no pilot pressure is input into both extended side/contracted side pilot ports 25_a_, 25_b_, the stick's direction change-over valve 25 is positioned at the neutral position N where the supply/discharge of stick cylinder 8 is not controlled; when the pilot pressure is input into the extended side pilot port 25_a_, the valve 25 is configured to be changed over to the extended side operating position X to open the supply valve passage 25_e_ from the pump port 25_p_ to first actuator port 25_c_, the discharge valve passage 25_f_ from second actuator port 25_d_ to the tank port 25_t_, and recycle valve passage 25_g_ which supplies a part of discharge oil from second actuator port 25_d_ to first actuator port 25_c_ as regenerated oil; also when the pilot pressure is input into the contracted side pilot port 25_b_, the valve 25 is configured to be changed over to the contracted side operating position Y to open the supply valve passage 25_e_ from the pump port 25_p_ to second actuator port 25_d_ and the discharge valve passage 25_f_ from first actuator port 25_c_ to the tank port 25_t_. The opening area of the supply/discharge/recycle valve passages 25_e_, 25_f_, 25_g_ is controlled to be increased or decreased depending on the spool position moved by the pilot pressure output from the stick's extended side/contracted side proportional solenoid valves 43_a_, 43_b_, and the discharge/recycle flow rates from the stick cylinder 8 are to be controlled by the opening area of the discharge/recycle valve passages 25_f_, 25_g_. When the stick's flow control valve 28 closes the stick's subside supply oil passage 18, the supply flow rate to the stick cylinder 8 is to be controlled by the opening area of the supply valve passage 25_e_ on the stick's direction change-over valve 25; when the stick's flow control valve 28 opens the stick's subside supply oil passage 18, the supply flow rate is to be controlled by the opening area of the stick's flow control valve 28 and the opening area of the supply valve passage 25_e_ on the stick's direction change-over valve 25.

Also, the boom's direction change-over valve 23 is the closed center spool valve for controlling the supply/discharge/recycle flow rates of boom cylinder 6 as well as changing over the supply/discharge directions; and the valve 23 has extended side/contracted side pilot ports 23_a_, 23_b_ respectively connected to the boom's extended side/contracted side proportional solenoid valves 41_a_, 41_b_ (shown in FIG. 2) for outputting the pilot pressure based on the control signal output from controller 10, the pump port 23_p_ connected to the boom's main side/subside supply oil passages 17, 20, the tank port 23_t_ connected to the tank line T, first actuator port 23_c_ connected to head side port 6_a_ on the boom cylinder 6, second actuator port 23_d_ connected to rod side port 6_b_ on the boom cylinder 6. The boom's direction change-over valve 23 has the same structure as the stick's direction change-over valve 25 mentioned above; when the valve 23 changes over from neutral position N to extended/contracted operating positions X, Y, the valve 23 is configured to open the supply valve passage 23_e_ from pump port 23_p_ to actuator port 23_c_ or 23_d_ and the discharge valve passage 24_f_ from the actuator port 23_d_ or 23_c_ to tank port 23_t_; and when the valve 23 is at the contracted side operating position Y, the valve 23 is configured to open recycle valve passage 23_g_ which supplies a part of discharge oil from first actuator port 23_c_ to second actuator port 23_d_ as regenerated oil. The opening area of the supply/discharge/recycle valve passages 23_e_, 23_f_, and 23_g_ is controlled to be increased or decreased depending on the spool position moved by the pilot pressure output from the boom's extended side/contracted side proportional solenoid valves 41_a_, 41_b_, and the discharge/recycle flow rates from the boom cylinder 6 are to be controlled by the opening area of the discharge/recycle valve passages 23_f_, 23_g_. When the boom's flow control valve 29 closes the boom's subside supply oil passage 20, the supply flow rate to the boom cylinder 6 is to be controlled by the opening area of the supply valve passage 23_e_ to the boom's direction change-over valve 23; when the boom's flow control valve 29 opens the boom's subside supply oil passage 20, the supply flow rate to the boom cylinder 6 is to be controlled by the opening area of the boom's flow control valve 29 and the opening area of the supply valve passage 23_e_ to the boom's direction change-over valve 23.

Further in FIG. 1, the signs E, F indicate a bleed line branched from an upstream position of all direction change-over valves 13, 14, 23 to 26 connected to the pump lines C, D to the tank line T, and bleed valves 31, 32 are disposed on the bleed lines E, F. These bleed valves 31, 32 are to be operated by the pilot pressure output from bleed's proportional solenoid valves 47_a_, 47_b_ (shown in FIG. 2) for controlling the increase or decrease of the bleed flow rate running from hydraulic pumps A, B through bleed lines E, F to oil tank 3; and the bleed's proportional solenoid valves 47_a_, 47_b_ are to control the increase or decrease of pilot pressure output to bleed valves 31, 32 based on the control signal output from controller 10.

Figure 2:
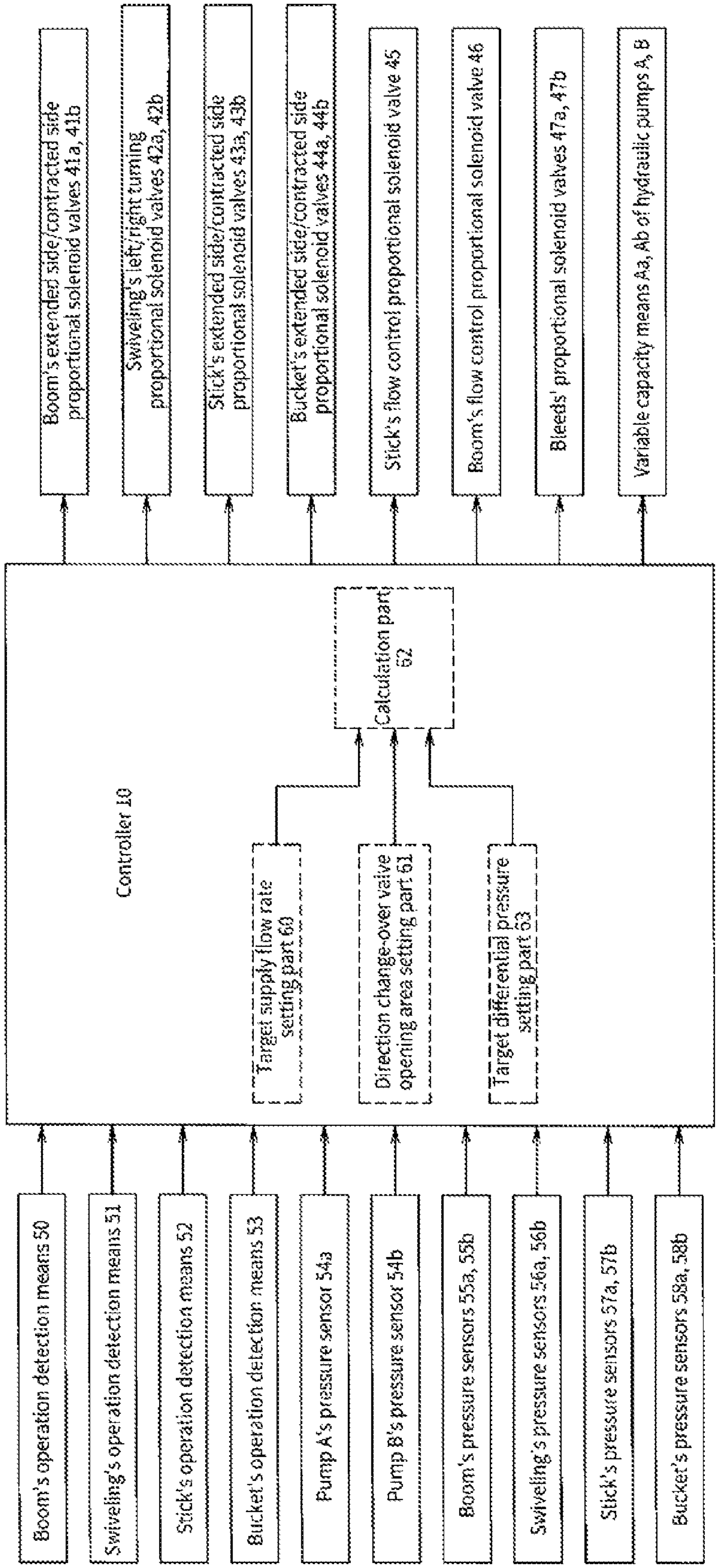
FIG. 2 is a block diagram illustrating input/output of controller.

As shown in the block diagram of FIG. 2, the controller 10 (corresponding to control means in this invention) is configured to input signals from a boom's operation detection means 50 for detecting operating direction and amount of a boom manipulator, a swiveling's operation detection means 51 for detecting operating direction and amount of a swiveling manipulator, a stick's operation detection means 52 for detecting operating direction and amount of a stick manipulator, a bucket's operation detection means 53 for detecting operating direction and amount of a bucket manipulator, pump A's/B's pressure sensors 54_a_, 54_b_ for detecting a hydraulic pump A's/B's pressure, boom's pressure sensors 55_a_, 55_b_ for detecting head side/rod side load pressures of boom cylinder 6, swiveling's pressure sensors 56_a_, 56_b_ for detecting left turning/right turning load pressures of swiveling motor 7, stick's pressure sensors 57*a*, 57*b* for detecting head side/rod side load pressures of stick cylinder 8, and bucket's pressure sensors 58*a*, 58*b* for detecting head side/rod side load pressures of bucket cylinder 9, and based on these input signals, output control signals to the boom's extended side/contracted side proportional solenoid valves 41*a*, 41*b*, swiveling's left/right turning proportional solenoid valves 42*a*, 42*b*, stick's extended side/contracted side proportional solenoid valves 43*a*, 43*b*, and bucket's extended side/contracted side proportional solenoid valves 44*a*, 44*b* for outputting pilot pressures respectively to pilot ports 23*a*, 23*b* to 26*a*, 26*b* on the boom's, swiveling's, stick's, and bucket's direction change-over valves 23 to 26, the stick's flow control proportional solenoid valve 45 outputting pilot pressure to the stick's flow control valve 28 disposed on the stick's subside supply oil passage 18, the boom's flow control proportional solenoid valve 46 outputting pilot pressure to the boom's flow control valve 29 disposed on the boom's subside supply oil passage 20, the bleeds' proportional solenoid valves 47*a*, 47*b* outputting pilot pressure to the bleed valves 31, 32, and variable capacity means Aa, Ba of hydraulic pumps A, B, and others, to control the oil supply/discharge for boom cylinder 6, swiveling motor 7, stick cylinder 8, and bucket cylinder 9, the flow rate of bleed lines E, F, and the delivery flow rate of hydraulic pumps A, B. Note that the controller 10 also controls a change-over of the straight travel valve 11 and the oil supply/discharge for left/right traveling motors 4, 5, but the explanation about these controls is omitted here.

Next, the explanation is provided about the control performed by the controller 10.

When the detection signal is input from the respective operation detection means 50 to 53 for boom, swiveling, stick, and bucket, the controller 10 calculates the target delivery flow rate according to the increase of operating amount of manipulator based on the detection signal in order to increase the delivery flow rate of hydraulic pumps A, B, and outputs the control signal to variable capacity means Aa, Ba of hydraulic pumps A, B so that the target delivery flow rate can be obtained. Here, the delivery flow rate of hydraulic pumps A, B is controlled individually according to the hydraulic pumps A, B as the hydraulic supply source of the hydraulic actuator to be operated.

Moreover, when the detection signal is input from the respective operation detection means 50 to 53 for boom, swiveling, stick, and bucket, the controller 10 outputs the control signal to the bleed's proportional solenoid valves 47*a*, 47*b* to control bleed valves 31, 32 in order to decrease the bleed flow rate (including decreasing it to zero) running from hydraulic pumps A, B to oil tank 3 according to the increase of operating amount of manipulator based on the detection signal. Here, the bleed flow rate of the bleed lines E, F is controlled individually according to the hydraulic pumps A, B as the hydraulic supply source of hydraulic actuator operated.

When the detection signal is input from respective operation detection means 50 to 53 for boom, swiveling, stick, and bucket, the controller 10 calculates the target supply flow rates Qs for the boom cylinder 6, swiveling motor 7, stick cylinder 8, and bucket cylinder 9 depending on the operating amount of each manipulator. Here, since the target working speed of each hydraulic actuator is preset according to the operating amount of manipulator, the target supply flow rate Qs corresponding to the operating amount of manipulator is set based on the target working speed; for each target working speed of the boom cylinder 6 and stick cylinder 8, which use both hydraulic pumps A, B as hydraulic supply source, the target supply flow rates Qa, Qb (Qa+Qb=Qs) is set for each hydraulic pump. When setting the target supply flow rates Qa, Qb for the boom/stick cylinders 6, 8, if the operating amount of manipulator is less than a preset value L (which is set individually for each operating amount of boom/stick manipulators), the controller 10 sets so that total target supply flow rate Qs to the boom/stick cylinders 6, 8 is supplied from hydraulic pump A or B to which boom's/stick's main side supply oil passages 17, 22 are connected, that is, total flow rate Qs of the boom cylinder 6 is supplied from the hydraulic pump A only and no flow rate is supplied from hydraulic pump B (Qs=Qa, Qb=0), total flow rate Qs of the stick cylinder 8 is supplied from the hydraulic pump B only and no flow rate is supplied from hydraulic pump A (Qs=Qb, Qa=0); and if the operating amount of manipulator is not less than the value L, the pressurized oil is supplied from both hydraulic pumps A, B (Qs=Qa+Qb, Qa≠0, Qb≠0).

Note that, the controller 10 comprises a target supply flow rate setting part 60 (corresponding to the target supply flow rate setting means of this invention) which sets target supply flow rates Qs, Qa, and Qb depending on their operating amount of manipulator; for example, the target supply flow rate setting part 60 has data such as a map indicating the relationship between the operating amount of manipulator and target supply flow rates Qs, Qa, and Qb and sets these target supply flow rates Qs, Qa, and Qb using the data; the data is to be incorporated into the target supply flow rate setting part 60 as a control parameter so that, for example, the target supply flow rate corresponding to the operating amount of manipulator can be changed depending on the work details of the hydraulic shovel.

The controller 10 outputs the control signal for outputting pilot pressure to corresponding hydraulic actuator's proportional solenoid valves 41*a*, 41*b* to 44*a*, 44*b*, 45, and 46 so that the target supply flow rate Qs is supplied to the boom cylinder 6, swiveling motor 7, stick cylinder 8, and bucket cylinder 9 to control the direction change-over valves 23 to 26 and flow control valves 28, 29. Here, as for the swiveling motor 7 and bucket cylinder 9 using either one of hydraulic pumps A, B as hydraulic supply source, the control signal is output to the swiveling's left/right turning proportional solenoid valves 42*a*, 42*b* and bucket's extended side/contracted side proportional solenoid valves 44*a*, 46*b* so that the supply valve passages 24*e*, 26*e* to the swiveling's/bucket's direction change-over valves 24, 26 have the opening area corresponding to their operating amount of manipulator. Also, the supply flow rate for the swiveling motor 7 and bucket cylinder 9 is controlled by the opening area of the supply valve passages 24*e*, 26*e* to the swiveling's/bucket's direction change-over valves 24, 26; and their discharge flow rate is controlled by the opening area of their discharge valve passages 24*f*, 26*f* at the spool move position corresponding to the opening area of the supply valve passages 24*e*, 26*e*.

Here, as for the boom/stick cylinders 6, 8 using both hydraulic pumps A, B as hydraulic supply source, the control signal is output to the boom's/stick's extended side/contracted side proportional solenoid valves 41*a*, 41*b* and 43*a*, 43*b* so that the supply valve passages 23*e*, 25*e* to the boom's/stick's direction change-over valves 23, 25 have the opening area corresponding to their operating amount of manipulator. Further, when the operating amount of manipulator is less than the setting value L, the controller 10 outputs control signal to the boom's/stick's flow control proportional solenoid valves 46, 45 to close the boom's/stick's flow control valves 29, 28 disposed on their subside supply oil passages 20, 18; and when the operating amount of manipulator is not less than the setting value L, the controller 10 outputs control signal to the boom's/stick's flow control proportional solenoid valves 46, 45 to open their flow control valves 29, 28.

Thus, when the operating amount of manipulator is less than the setting value L, only the supply flow rate from hydraulic pump A or B connected to the boom's/stick's main side supply oil passages 17, 22 is supplied to the boom/stick cylinders 6, 8; the supply flow rate to the boom/stick cylinders 6, 8 is controlled by the opening area of the supply valve passages 23*e*, 25*e* to the boom's/stick's direction change-over valves 23, 25 (supply valve passages 23*e*, 25*e* to the boom's/stick's direction change-over valves). The discharge/recycle flow rates are controlled by the opening area of the discharge/recycle valve passages 23*f*, 25*f*, 23*g*, and 25*g* at the spool move position corresponding to the opening area of the supply valve passages 23*e*, 25*e* to the boom's/stick's direction change-over valves 23, 25.

When the operating amount of manipulator is not less than the setting value L, the total flow rate is supplied from both hydraulic pumps A, B to the boom/stick cylinders 6, 8 and the supply flow rate to the boom/stick cylinders 6, 8 is controlled by the opening area of supply valve passages 23*e*, 25*e* to the boom's/stick's direction change-over valves and the opening area of their flow control valves 29, 28. Here, the discharge/recycle flow rates are also controlled by the opening area of the discharge/recycle valve passages 23*f*, 25*f*, 23*g*, and 25*g* at the spool move position corresponding to the opening area of the supply valve passages 23*e*, 25*e* to the boom's/stick's direction change-over valves 23, 25.

Note that the controller 10 comprises a direction change-over valve opening area setting part 61 (corresponding to a direction change-over valve's opening area setting means of this invention) which sets the opening area of supply/discharge valve passages 23*e* to 26*e*, 23*f* to 26*f* for the direction change-over valves 23 to 26 depending on the operating amount of manipulator; for example, the direction change-over valve opening area setting part 61 has the data such as a map indicating the relationship between the operating amount of manipulator and opening area (or spool move position) of supply/discharge valve passages 23*e* to 26*e*, 23*f* to 26*f* for the direction change-over valves 23 to 26 and sets the opening area using the data; the data is to be incorporated into the direction change-over valve opening area setting part 61 as a control parameter so that, for example, the opening area of the supply/discharge valve passages 23*e* to 26*e*, 23*f* to 26*f* for the direction change-over valves 23 to 26 can be changed according to their operating amount of manipulator depending on the work details of the hydraulic shovel. By the way, the relationship of opening areas of supply and discharge valve passages 23*e* to 26*e* and 23*f* to 26*f* for the direction change-over valves 23 to 26 is uniquely determined by the spool move position, so it cannot be changed.

In the present embodiment, the boom cylinder 6 and stick cylinder 8 are hydraulic actuator corresponding to the large flow hydraulic actuator of this invention as described above and use both first and second hydraulic pumps of this invention as hydraulic supply source; the first hydraulic pump of this invention is connected to the main side supply oil passage and the second hydraulic pump is connected to the subside supply oil passage; when the boom cylinder 6 is used as the large flow hydraulic actuator of this invention, the hydraulic pumps A and B become first and second hydraulic pumps respectively, and when the stick cylinder 8 is used as the large flow hydraulic actuator, the hydraulic pumps B and A become first and second hydraulic pumps respectively.

As mentioned above, when the operating amount of manipulator is not less than the setting value L, the supply flow rate to the boom/stick cylinders 6, 8 is controlled by the opening area of the supply valve passages 23*e*, 25*e* to the boom's/stick's direction change-over valves and the opening area of the boom's/stick's flow control valves 29, 28; the opening area of the supply valve passages 23*e*, 25*e* to the boom's/stick's direction change-over valves is controlled so as to have the opening area corresponding to their operating amount of manipulator; the opening area of the boom's/stick's flow control valves 29, 28 is controlled so as to be the target opening area At calculated by a calculation part 62 (corresponding to the calculation means of this invention) disposed on the controller 10. Here, the calculation part 62 is to calculate a target opening area Af so that the flow rate passing through the boom's/stick's flow control valves 29, 28 become target supply flow rates Qb, Qa of hydraulic pumps B, A connected to the boom's/stick's subside supply oil passages 20, 18 where the boom's/stick's flow control valves 29, 28 are arranged; the explanation is provided below about a calculation procedure and how to calculate the target opening area Af is the same in both boom's and stick's flow control valves 29, 28, so the stick's flow control valves 28 is taken as an example of the calculation.

First, the calculation part 62 calculates differential pressure ΔPs before and after the flow passes through the supply valve passage 25*e* to the stick's direction change-over valve at the target supply flow rate Qs (Qs=Qa+Qb) based on the target supply flow rate Qs from both hydraulic pumps A, B to the stick cylinder 8 and the opening area As of the supply valve passage 25*e* to the stick's direction change-over valve, using a formula (1) below. Further, the calculation part 62 calculates the differential pressure ΔPf is calculated before and after the stick's flow control valve 28 based on the differential pressure ΔPs calculated before and after the supply valve passage 25*e* to the stick's direction change-over valve and the target differential pressure ΔPc preset as a target between the hydraulic pump A's pressure and load pressure of stick cylinder 8, using the formula (2) below. The target opening area Af of the stick's flow control valve 28 is calculated when the flow passes through the stick's flow control valve 28 at the target supply flow rate Qa from the hydraulic pump A based on the differential pressure ΔPf calculated before and after the stick's flow control valve 28 and target supply flow rates Qa from the hydraulic pump A where the stick's subside supply oil passage 18 is connected, using the formula (3) below:

$$\Delta Ps=\{Qs/(C\cdot As)\}2 \quad (1)$$

$$\Delta Pf=\Delta Pc-\Delta Ps \quad (2)$$

$$Af=Qa/(C\cdot\sqrt{\Delta Pf}) \quad (3)$$

Where, in formulas (1), (2), and (3), Qs is the target supply flow rate from both first and second hydraulic pumps A, B, Qa is the target supply flow rate from the hydraulic pump A, As is the opening area of the supply valve passage 25*e* to the stick's direction change-over valve, Af is the target opening area of the stick's flow control valve 28, ΔPc is the target differential pressure between the hydraulic pump A's pressure and load pressure of stick cylinder 8, ΔPs is the differential pressure before and after the supply valve passage 25*e* to the stick's direction change-over valve, ΔPf is the differential pressure before and after the stick's flow control valve 28, and C is a factor.

Also, the formulas (1), (3) are derived from an orifice flow formula (4) shown below:

$$Q=C\cdot A\cdot\sqrt{\Delta P} \quad (4)$$

Where in the formula (4), Q is an orifice flow rate, A is an orifice opening area, ΔP is an orifice differential pressure, and C is a factor.

Further, the target differential pressure ΔPc is the preset value as the differential pressure between the hydraulic pump A's pressure and load pressure of stick cylinder 8, as mentioned above; the relationship between the pump's flow rate relative to the operating amount of manipulator and opening area of supply valve passage 25*e* to the stick's direction change-over valve is designed and coordinated so that the target differential pressure ΔPc can be held. Note that the target differential pressure ΔPc may be a fixed value or a value put in a map relative to the operating amount of manipulator and is set in the target differential pressure setting part 63 (corresponding to the target differential value setting means of this invention) disposed on the controller 10.

By controlling the opening area of the stick's flow control valve 28 so as to keep the target opening area Af thus calculated, the flow passing through the stick's flow control valve 28 is controlled to keep the target supply flow rate Qa from the hydraulic pump A to the stick cylinder 8 and the flow passing through the supply valve passage 25*e* to the stick's direction change-over valve is controlled to keep the target supply flow rate Qs from both first and second hydraulic pumps A, B to the stick cylinder 8. By increasing or decreasing the opening area of the stick's flow control valve 28 even if the opening area As of the supply valve passage 25*e* to the stick's direction change-over valve is set depending on the operating amount of manipulator, the supply flow rate to the stick cylinder 8 can be controlled to be increased or decreased; since the discharge/recycle flow rates from the stick cylinder 8 are controlled by the opening area of the discharge/recycle valve passages 25*f*, 25*g* from the stick's direction change-over valve 25, the relationship among the supply, discharge, and recycle flow rates for stick cylinder 8 can be changed by increasing or decreasing the opening area of the stick's flow control valve 28.

Next, the explanation is provided specifically about the control of the stick's direction change-over valve 25 and stick's flow control valve 28 through the controller 10 when the stick manipulator is operated alone to the extended side (stick in side).

Figure 3:
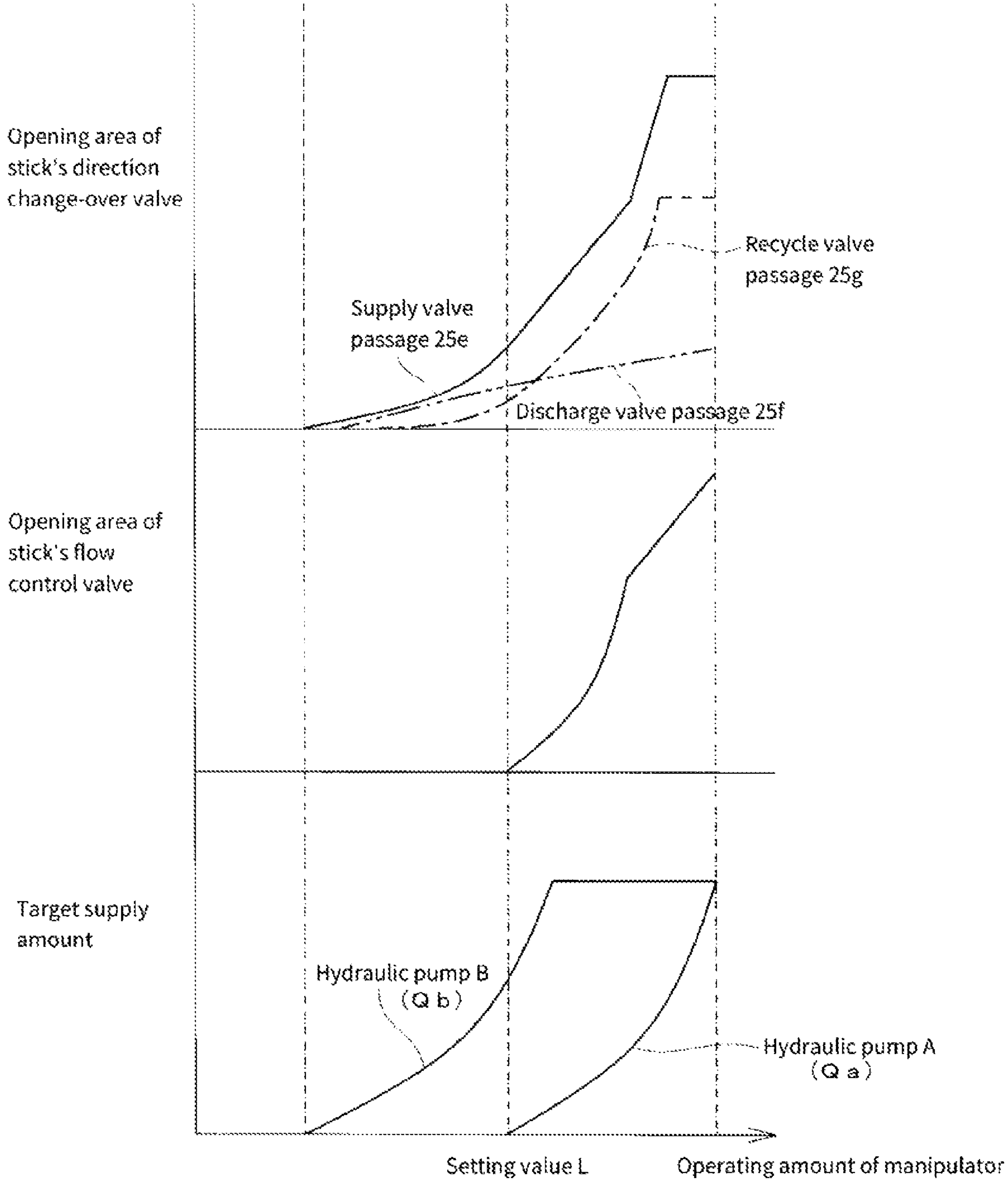
FIG. 3 is a diagram, when the stick manipulator is operated alone, illustrating the relationship among the operating amount of the manipulator, target supply flow rate of first and second hydraulic pumps, opening area of the stick's flow control valve, and opening area of the stick's direction change-over valve.
Figure 4:
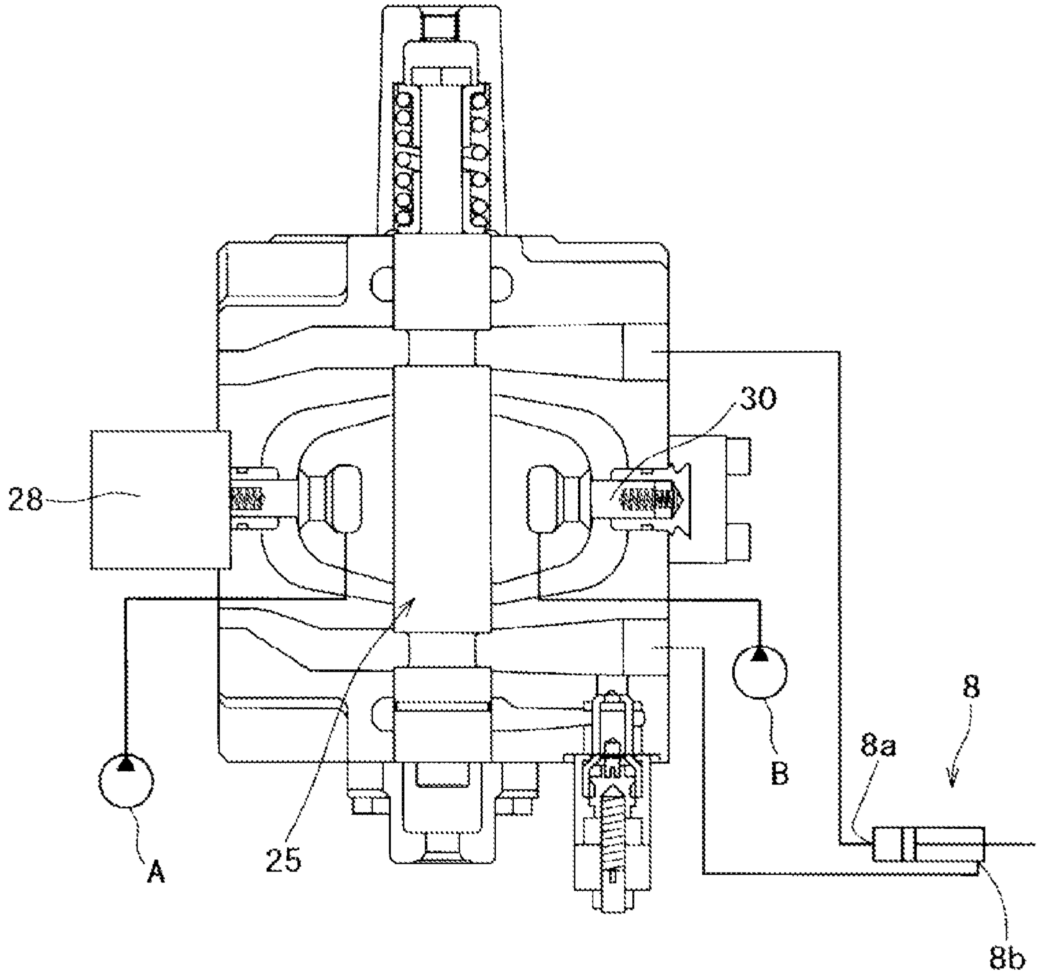
FIG. 4 is a diagram illustrating incorporated state of the stick's direction change-over valve and stick's flow control valve.

When the stick manipulator is operated alone to the extended side, the controller 10 sets the target supply flow rates Qa, Qb from hydraulic pumps A, B to the stick cylinder 8; here, when the operating amount of manipulator is less than the preset value L, the target supply flow rate Qb of hydraulic pump B connected to the stick's main side supply oil passage 22 is set to increase depending on the operating amount of manipulator and the target supply flow rate Qa of hydraulic pump A is set to "zero" which is connected to the stick's subside supply oil passage 18. When the operating amount of manipulator is not less than the setting value L, the target supply flow rate Qb of hydraulic pump B is increased to maximum, and the target supply flow rate Qa of hydraulic pump A is set to increase depending on the increase of operating amount of manipulator (see FIG. 3).

Further, when the stick manipulator is operated alone to the extended side, the controller 10 sets the opening area As of supply valve passage 25*e* to the stick's direction change-over valve 25 depending on the operating amount of manipulator. Here, the opening area of discharge/recycle valve passages 25*f*, 25*g* is also set by the spool move position corresponding to the opening area As of supply valve passage 25*e*. Further, when the operating amount of manipulator is not less than the setting value L, the controller 10 calculates the target opening area Af in order that the flow rate passing through the stick's flow control valve 28 disposed on the stick's subside supply oil passage 18 is set to the target supply flow rate Qa of the hydraulic pump A, as mentioned above, using the formulas (1), (2), and (3).

The controller 10 outputs the control signal to the stick's extended side proportional solenoid valve 43*a* to change over the stick's direction change-over valve 25 to the extended side operating position X as well as controls so that the opening area of the supply valve passage 25*e* keeps the preset opening area As at the extended side operating position X. Further, the controller 10 outputs the control signal to the stick's flow control proportional solenoid valve 45 in order to control the supply flow rate from the stick's flow control valve 28 to the stick's direction change-over valve 25; here, when the operating amount of manipulator is less than the setting value L, the controller 10 controls to close the stick's flow control valve 28, and when the operating amount of manipulator is not less than the value L, the controller 10 controls the stick's flow control valve 28 to keep the target opening area Af above calculated.

Thus, when the operating amount of manipulator is less than the setting value L, the pressurized oil is supplied only from the hydraulic pump B to the stick cylinder 8, and its supply flow rate is controlled by the opening area As of the supply valve passage 25*e* to the stick's direction change-over valve 25; when the operating amount of manipulator is not less than the setting value L, the pressurized oil is supplied from both hydraulic pumps A, B, and its supply flow rate is controlled by the opening area As of the supply valve passage 25*e* to the stick's direction change-over valve 25 and the opening area Af of the stick's flow control valve 28. Also, the discharge/recycle flow rates for the stick cylinder 8 are controlled by the opening area of the discharge/recycle valve passages 25*f*, 25*g* respectively from the stick's direction change-over valve 25.

In this embodiment configured above, the hydraulic control system of hydraulic shovel comprises: hydraulic pumps A, B, boom/stick cylinders 6, 8 using these hydraulic pumps A, B as hydraulic supply source, swiveling motor 7 and bucket cylinder 9 using either one of the hydraulic pumps A, B as hydraulic supply source, and others; when controlling the supply/discharge flow rates to/from the boom/stick cylinders 6, 8 which use both hydraulic pumps A, B as hydraulic supply source, the similar control of the stick cylinder 8 will be taken as an example for providing the explanation; the system is provided with the stick's direction change-over valve 25 having supply valve passage 25*e* to and discharge valve passage 25*f* from the stick cylinder 8 and changing over the supply/discharge directions, the stick's main side/subside supply oil passages 22, 18 respectively connecting hydraulic pumps B, A to the pump port 25*p* of the stick's direction change-over valve 25, the stick's flow control valve 28 arranged at the stick's subside supply oil passage 18 for controlling the supply flow rate from the hydraulic pump A to the stick's direction change-over valve 25, and the controller 10 controlling the operation of the stick's direction change-over valves 25 and stick's flow control valve 28; when the operating amount of the stick manipulator is less than the setting value L, only the supply flow rate is supplied from the hydraulic pump B through the stick's main side supply oil passage 22 to the stick's direction change-over valve 25 by closing the stick's flow control valve 28; when the operating amount of the stick manipulator is not less than the value L, supply flow rate from the hydraulic pump A passing through the stick's subside side supply oil passages 18 and supply flow rate from the hydraulic pump B passing through the stick's main side supply oil passages 22 are configured to be joined together to be supplied to the stick's direction change-over valve 25, by opening the stick's flow control valve 28; the discharge flow rate from the stick cylinder 8 is controlled based on the opening area of the discharge valve passage 25*f* from the stick's direction change-over valve 25; and when the stick's flow control valve 28 is closed, the supply flow rate is controlled based on the opening area of the supply valve passage 25*e* to the stick's direction change-over valve 25; when the stick's flow control valve 28 is opened, the supply flow rate is controlled based on the opening area of the stick's flow control valve 28 and the opening area of supply valve passage 25*e* to the stick's direction change-over valve 25. The controller 10 comprises the target supply flow rate setting part 60 for setting the target supply flow rates Qa, Qb respectively from hydraulic pumps A, B to the stick cylinder 8 depending on the operating amount of the stick's hydraulic manipulator, the direction change-over valve opening area setting part 61 for setting the opening areas of the supply/discharge valve passage 25*e*, 25*f* to/from the stick's direction change-over valve 25 depending on the operating amount of the stick manipulator, the target differential pressure setting part 63 for setting the target differential pressure ΔPc between the hydraulic pump A's pressure and load pressure of stick cylinder 8, and the calculation part 62 for calculating the target opening area Af of the stick's flow control valve 28 for supplying the flow at the target supply flow rate Qa from the hydraulic pump A to the cylinder 8 based on the target supply flow rates Qa, Qb preset above, the opening area As of the supply valve passage 25*e*, and the target differential pressure ΔPc; the controller 10 controls the operation of the stick's flow control valve 28 so as to keep the target opening area Af calculated at the calculation part 62.

Thus, when the operating amount of manipulator is less than the setting value L, the hydraulic oil is supplied from first one of hydraulic pumps A, B to the boom/stick cylinders 6, 8, which use both pumps A, B as hydraulic supply source; when the operating amount of manipulator is not less than the value L, the hydraulic oil is supplied from both hydraulic pumps A, B; when the hydraulic oil is supplied from both hydraulic pumps A, B, the supply flow rate is controlled based on the opening area of the boom's/stick's flow control valves 29, 28 disposed on the boom's/stick's subside supply oil passages 20, 18 connected to second one of hydraulic pumps A, B and the opening area of the supply valve passages 23*e*, 25*e* to the boom's/stick's direction change-over valves 23, 25; and the discharge flow rate is controlled based on the opening area of the discharge valve passages 23*f*, 25*f* from the boom's/stick's direction change-over valves 23, 25; this enables to change the relationship between supply and discharge flow rates of the boom/stick cylinders 6, 8 by increasing or decreasing the opening area of the boom's/stick's flow control valves 29, 28 even if the relationship is unique between the opening areas of the supply valve passages 23*e*, 25*e* and discharge valve passages 23*f*, 25*f* to/from the boom's/stick's direction change-over valves 23, 25. In an area (operating amount of manipulator is not less than the setting value L) where more hydraulic oil is supplied from both hydraulic pumps A, B, an operability and working efficiency can be improved by changing the relationship between the supply and discharge flow rates; and in the area (operating amount of manipulator is less than the setting value L) where less hydraulic oil is supplied from first one of hydraulic pumps A, B, controlling the supply flow rate only with the boom's/stick's direction change-over valves 23, 25 can also omit the flow control valve to the main side supply oil passage where the first one of hydraulic pumps A, B is connected and the proportional solenoid valve for pilot operating the flow control valve, contributing to reduce a number of parts, simplify the circuit, and reduce a cost.

Thus, the present embodiment enables to change the relationship between the supply and discharge flow rates in the area where more hydraulic oil is supplied from both hydraulic pumps A, B by disposing the boom'/stick's flow control valves 29, 28 on the boom'/stick's subside supply oil passages 20, 18; here, since the supply flow rate from both hydraulic pumps A, B to the boom/stick cylinders 6, 8 is to be controlled by the opening area of the boom's/stick's flow control valves 29, 28 and the opening area of the supply valve passages 23*e*, 25*e* to the boom's/stick's direction change-over valves 23, 25, there is no need to design so large opening area of the supply valve passages 23*e*, 25*e* to the boom's/stick's direction change-over valves 23, 25 as the differential pressure does not arise before and after the supply valve passages 23*e*, 25*e*, avoiding large size of the boom's/stick's direction change-over valves 23, 25.

Also, when controlling the supply flow rate to the boom/stick cylinders 6, 8 by means of the opening area of the boom's/stick's flow control valves 29, 28 and the opening area of the supply valve passages 23*e*, 25*e* to the boom's/stick's direction change-over valves 23, 25, the controller 10 is configured to calculate the target opening area Af of the boom's/stick's flow control valves 29, 28 based on the target supply flow rates Qa, Qb from hydraulic pumps A, B to the boom/stick cylinders 6, 8, the opening area As of the supply valve passages 23*e*, 25*e* to the boom's/stick's direction change-over valves 23, 25, the target differential pressure ΔPc between the pump pressure of hydraulic pumps B, A supplying hydraulic oil to the boom's/stick's flow control valves 29, 28 and load pressure of the boom/stick cylinders 6, 8, so the opening area of the boom'/stick's flow control valves 29, 28 can be controlled to be depending on the target supply flow rates Qa, Qb, the opening area As of the supply valve passages 23*e*, 25*e* to the boom's/stick's direction change-over valves, and the target differential pressure ΔPc between the pump pressure of hydraulic pumps B, A and load pressure of boom/stick cylinders 6, 8, enabling highly accurate supply flow control.

Further, when calculating the target opening area Af of the boom's/stick's flow control valves 29, 28, the calculation part 62 is configured to calculate the differential pressure ΔPs before and after the supply valve passages 23*e*, 25*e* to the boom's/stick's direction change-over valves based on the target supply flow rates Qa, Qb from hydraulic pumps A, B to the boom/stick cylinders 6, 8 and the opening area As of the supply valve passages 23*e*, 25*e* to the boom's/stick's direction change-over valves, further calculate the differential pressure ΔPf before and after the boom's/stick's flow control valves 29, 28 based on the differential pressure ΔPs calculated before and after the supply valve passages 23*e*, 25*e* to the boom's/stick's direction change-over valves and the target differential pressure ΔPc, and calculate the target opening area Af of the boom's/stick's flow control valves 29, 28 based on the differential pressure ΔPf calculated before and after the boom's/stick's flow control valves 29,

28 and the target supply flow rates Qb, Qa of hydraulic pumps B, A supplying hydraulic oil to the boom's/stick's flow control valves 29, 28; this enables to calculate the target opening area Af of the boom's/stick's flow control valves 29, 28 for supplying the flow at the target supply flow rates Qa, Qb to the boom/stick cylinders 6, 8, helping to improve the accuracy of the supply flow control.

Figure 5:
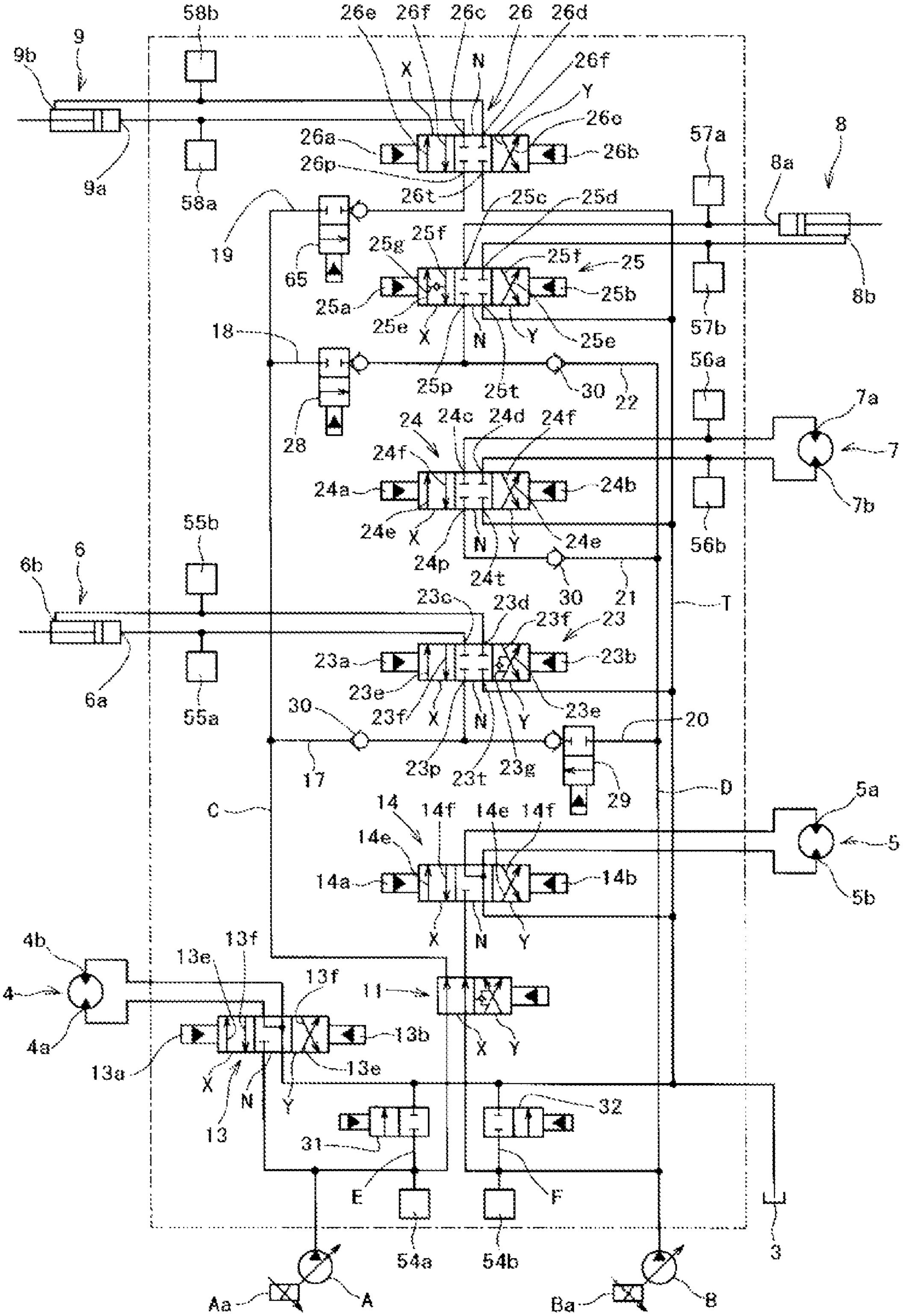
FIG. 5 is a hydraulic circuit diagram illustrating a second embodiment.

Now, the explanation is provided below about the second embodiment of the present invention based on the FIG. 5. The second embodiment differs from the first in an oil supply/discharge control to/from the bucket cylinder 9, and the other part is the same as the first and has the same sign, so the explanation is omitted about it. In the first embodiment, this invention is applied to the oil supply/discharge control of the large flow hydraulic actuator (boom/stick cylinders 6, 8) using both first and second hydraulic pumps as hydraulic supply source; in the second embodiment, this invention is applied to the oil supply/discharge control of the hydraulic actuator (bucket cylinder 9) using the single hydraulic pump as hydraulic supply source. Also, the FIG. 2 is shared between first and second embodiments.

In the second embodiment, the bucket's flow control valve 65 for controlling the supply flow rate from the hydraulic pump A to the bucket's direction change-over valve 26 is disposed on bucket's supply oil passage 19 from the hydraulic pump A to the pump port 26*p* on the bucket's direction change-over valve 26. The bucket's flow control valve 65 is the poppet valve pilot operated by the bucket's flow control proportional solenoid valve (not shown) working based on the control signal output from the controller 10 and has the same structure as stick's/boom's flow control valves 28, 29 in the first embodiment.

The bucket's direction change-over valve 26 is similar to the direction change-over valve in the first embodiment, comprises the extended side/contracted side pilot ports 26*a*, 26*b*, the pump port 26*p*, the tank port 26*t*, the first and second actuator ports 26*c*, 26*d*, and is configured to be changed over from neutral position N to the extended side/contracted side operating position X or Y to open the supply valve passage 26*e* from the pump port 26*p* to the actuator port 26*c* or 26*d* and the discharge valve passage 26*f* from the actuator port 26*d* or 26*c* to the tank port 26*t* by the pilot pressure output from the bucket's extended side/contracted side proportional solenoid valves 44*a*, 44*b*. The opening area of these supply/discharge oil passages 26*e*, 26*f* is controlled to be increased or decreased depending on the spool move position moved by the pilot pressure output from the bucket's extended side/contracted side proportional solenoid valves 44*a*, 44*b*, the discharge flow rate from the bucket cylinder 9 is to be controlled by the opening area of the discharge valve passage 26*f*, and the supply flow rate to the bucket cylinder 9 is to be controlled by the opening area of the supply valve passage 26*e* to the bucket's direction change-over valve 26 and the opening area of the bucket's flow control valve 65 positioned at the upstream side of the bucket's direction change-over valve 26.

When the detection signal is input from the bucket's operation detection means 53, in the target supply flow rate setting part 60, the controller 10 sets the target supply flow rate Qs of the bucket cylinder 9 according to the operating amount of manipulator. Further, in the direction change-over valve opening area setting part 61, the controller 10 sets the opening area As of the supply valve passage 26*e* to the bucket's direction change-over valve 26 according to the operating amount of manipulator and controls the bucket's direction change-over valve 26 so as to keep the opening area As configured. Here, the opening area of discharge valve passage 26*f* is also set by the spool move position corresponding to the opening area As of supply valve passage 26*e*. Further, in the calculation part 62, the controller 10 calculates the target opening area Af so as to pass through the bucket's flow control valve 65 at the target supply flow rate Qs and controls the bucket's flow control valve 65 so as to keep the target opening area Af calculated.

When calculating the target opening area Af of the bucket's flow control valve 65, the calculation part 62 calculates the differential pressure ΔPs when the flow passes at the target supply flow rate Qs before and after the supply valve passage 26*e* to the bucket's direction change-over valve based on the target supply flow rate Qs to the bucket cylinders 9 and the opening area As of the supply valve passage 26*e* to the bucket's direction change-over valve, using the formula (5) below. Further, the differential pressure ΔPf is calculated before and after the bucket's flow control valve 65 based on the differential pressure ΔPs calculated before and after the supply valve passage 26*e* to the bucket's direction change-over valve and the target differential pressure ΔPc preset as the target differential pressure between the hydraulic pump A's pressure and load pressure of the bucket cylinder 9, using the formula (6) below. Further, the target opening area Af of the bucket's flow control valve 65 is calculated when the flow passes through the bucket's flow control valve 65 at the target supply flow rate Qs based on the differential pressure ΔPf before and after the bucket's flow control valve 65 calculated and the target supply flow rate Qs to the bucket cylinders 9, using the formula (7) below:

$$\Delta Ps=\{Qs/(C\cdot As)\}2 \tag{5}$$

$$\Delta Pf=\Delta Pc-\Delta Ps \tag{6}$$

$$Af=Qs/(C\cdot\sqrt{\Delta Pf}) \tag{7}$$

Where, in formulas (5), (6), and (7), Qs is the target supply flow rate to the bucket cylinder 9, As is the opening area of the supply valve passage 26*e* to the bucket's direction change-over valve, Af is the target opening area of the bucket's flow control valve 65, ΔPc is the target differential pressure between the hydraulic pump A's pressure and load pressure of bucket cylinder 9, ΔPs is the differential pressure before and after the supply valve passage 26*e* to the bucket's direction change-over valve, ΔPf is the differential pressure before and after the bucket's flow control valve 65, and C is a factor.

The flow passing through the bucket's flow control valve 65 and supply valve passage 26*e* to the bucket's direction change-over valve is controlled to keep the target supply flow rate Qs to the bucket cylinder 9 by controlling the opening area of the bucket's flow control valve 65 so as to keep the target opening area Af calculated. By increasing or decreasing the opening area of the bucket's flow control valve 65 even if the opening area As of the supply valve passage 26*e* to the bucket's direction change-over valve is set depending on the operating amount of manipulator, the supply flow rate to the bucket cylinder 9 can be controlled to be increased or decreased; since the discharge flow rate from the bucket cylinder 9 is controlled by the opening area of the discharge valve passage 26*f* from the bucket's direction change-over valve 26, the relationship between the supply and discharge flow rates for the bucket cylinder 9 can be changed by increasing or decreasing the opening area of the bucket's flow control valve 65.

The second embodiment described above has the supply/discharge valve passages 26*e*, 26*f* to/from the bucket cylinder 9, and the bucket's flow control valve 65 is disposed for controlling the supply flow rate from the hydraulic pump A to the bucket's direction change-over valve 26 at the upstream side of the bucket's direction change-over valve 26 for changing over the supply/discharge directions. The supply flow rate to the bucket cylinder 9 is configured to be controlled based on the opening area of the discharge valve passage **26*f* from the bucket's direction change-over valve 26; its supply flow rate is configured to be controlled based on the opening area of the supply valve passage 26*e* to the bucket's direction change-over valve 26 and the opening area of the bucket's flow control valve 65; the controller 10 comprises the target supply flow rate setting part 60 for setting the target supply flow rate Qs from hydraulic pump A to the bucket cylinder 9 depending on the operating amount of the bucket manipulator, the direction change-over valve opening area setting part 61 for setting the opening area of the supply/discharge valve passages 26*e*, 26*f* to/from the bucket's direction change-over valves 26 depending on the operating amount of the bucket manipulator, the target differential pressure setting part 63 for setting the target differential pressure ΔPc between the hydraulic pump A's pressure and load pressure of bucket cylinder 9, and the calculation part 62 for calculating the target opening area Af of the bucket's flow control valve 65 in order to supply the target supply flow rate Qs to the bucket cylinder 9 based on these target supply flow rate Qs, the opening area As of the supply valve passages 26*e* to the bucket's direction change-over valve, and target differential pressure ΔPc, controlling the operation of the valve 65 so as to keep the target opening area Af calculated at the part 62**.

Thus, the supply flow rate to the bucket cylinder 9 is controlled based on the opening area of the supply valve passage **26*e* to the bucket's direction change-over valve 26 and the opening area of the bucket's flow control valve 65; even if the relationship is uniquely determined between opening areas of the supply/discharge valve passages 26*e* and 26*f* to/from the bucket's direction change-over valve 26, increasing or decreasing the opening area of the bucket's flow control valve 65 can change the relationship between the supply/discharge flow rates for the bucket cylinder 9**.

Thus, in the second embodiment, the relationship between the supply/discharge flow rates for the bucket cylinder 9 can be changed by arranging the bucket's flow control valve 65 at the upstream side of the bucket's direction change-over valve 26; here, the supply flow rate to the bucket cylinder 9 is controlled by the opening area of the supply valve passage **26*e* to the bucket's direction change-over valve 26 and the opening area of the bucket's flow control valve 65, so there is no need to design so large opening area of the supply valve passages 26*e* to the bucket's direction change-over valves 26 as the differential pressure does not arise before and after the supply valve passages 26*e*, avoiding large size of the bucket's direction change-over valve 26**.

When the supply flow rate to the bucket cylinder 9 is controlled by the opening area of the supply valve passage **26*e* to the bucket's direction change-over valve 26 and the opening area of the bucket's flow control valve 65, the controller 10 is configured to calculate the target opening area Af of the bucket's flow control valve 65 based on the target supply flow rate Qs from hydraulic pump A to the bucket cylinder 9, the opening area As of the supply valve passage 26*e* to the bucket's direction change-over valve 26, and the target differential pressure ΔPc between the hydraulic pump A's pressure and load pressure of bucket cylinder 9, so the opening area of the bucket's flow control valve 65 can be controlled to be depending on the target supply flow rate Qs, the opening area As of the supply valve passage 26*e* to the bucket's direction change-over valve, and the target differential pressure ΔPc between the pump pressure and load pressure of bucket cylinder 9**, enabling highly accurate supply flow control.

Further, when calculating the target opening area Af of the bucket's flow control valve 65, the calculation part 62 is configured to calculate the differential pressure ΔPs before and after the supply valve passages **26*e* to the bucket's direction change-over valve based on the target supply flow rate Qs from hydraulic pump A to the bucket cylinder 9 and the opening area As of the supply valve passage 26*e* to the bucket's direction change-over valve, further calculate the differential pressure ΔPf before and after the bucket's flow control valve 65 based on the differential pressure ΔPs calculated before and after the supply valve passage 26*e* to the bucket's direction change-over valve and the target differential pressure ΔPc, and calculate the target opening area Af of the bucket's flow control valve 65 based on the differential pressure ΔPf calculated before and after the bucket's flow control valve 65 and the target supply flow rate Qs; this enables to accurately calculate the target opening area Af of the bucket's flow control valve 65 for supplying the target supply flow rate Qs to the bucket cylinder 9**, helping to improve the accuracy of the supply flow control.

Note that this invention is obviously not limited to the first and second embodiments; for example, the flow control valve with the same structure as the flow control valve arranged at the subside supply oil passage may be arranged at the main side supply oil passage (boom's/stick's main side supply oil passages 17, 22, in the first embodiment) connecting first hydraulic pump to the direction change-over valve of the large flow hydraulic actuator. Here, the relationship between the supply and discharge flow rates of the large flow hydraulic actuator can be changed in a whole operation range by setting the flow control valve arranged at the main side supply oil passage to open in the whole operation range of manipulator and controlling its opening area in the same way as that disposed on the subside supply oil passage.

Also, when implementing this invention, the opening area of flow control valve calculated by the calculation means may be configured to be compensated based on detection values from the pressure sensors measuring the hydraulic pump pressure and load pressure of hydraulic actuator, thus enabling more accurate supply flow control.

Further, this invention can obviously be implemented to various working machines with hydraulic actuator without being limited to hydraulic shovel.

INDUSTRIAL APPLICABILITY

This invention is available for use in the hydraulic control system of working machine such as hydraulic shovel.

The invention claimed is:

1. A hydraulic control system comprising a hydraulic pump and a hydraulic actuator using the hydraulic pump as a hydraulic supply source, wherein the system is provided with a direction change-over valve having supply/discharge valve passages for the hydraulic actuator and changing over supply/discharge directions, a flow control valve arranged at an upstream side of the direction change-over valve for controlling a supply flow rate from the hydraulic pump to the direction change-over valve, and a control means for controlling an operation of the direction change-over valve and the flow control valve;

a discharge flow rate for the hydraulic actuator is configured to be controlled based on an opening area of the discharge valve passage from of the direction change-over valve, and a supply flow rate from the hydraulic pump to the hydraulic actuator is configured to be controlled based on an opening area of the supply valve passage to of the direction change-over valve and an opening area of the flow control valve;

wherein the control means comprises: a target supply flow rate setting means to set up a target supply flow rate from the hydraulic pump to the hydraulic actuator depending on an operating amount of a hydraulic actuator's manipulator; a direction change-over valve's opening area setting means to set up the opening area of the supply/discharge valve passages for the direction change-over valve depending on the operating amount of the hydraulic actuator's manipulator; a target differential pressure setting means to set up a target differential pressure between a hydraulic pump pressure and a load pressure of the hydraulic actuator; and a calculation means to calculate a target opening area of the flow control valve for supplying the target supply flow rate to the hydraulic actuator based on the target supply flow rate preset above, the opening area of the supply valve passage to of the direction change-over valve, and the target differential pressure; and wherein the control means controls an operation of the flow control valve so as to keep the target opening area calculated by the calculation means.

2. The hydraulic control system of claim 1, wherein when calculating the target opening area of the flow control valve, the calculation means calculates a differential pressure before and after the supply valve passage of the direction change-over valve based on the target supply flow rate and the opening area of the supply valve passage of the direction change-over valve, further calculates a differential pressure before and after the flow control valve based on the differential pressure before and after the supply valve passage of the direction change-over valve and the target differential pressure, and additionally calculates the target opening area of the flow control valve based on the differential pressure before and after the flow control valve.

3. The hydraulic control system of claim 1, wherein the hydraulic pump comprises: first and second hydraulic pumps; wherein the hydraulic actuator is a large flow hydraulic actuator using both first and second hydraulic pumps as the hydraulic supply source; the direction change-over valve having the supply/discharge valve passages for the large flow hydraulic actuator and changing over the supply/discharge directions; main side/subside supply oil passages respectively connecting the first and second hydraulic pumps to a pump port of the direction change-over valve; wherein the system arranges the flow control valve for controlling a supply flow rate from the second hydraulic pump to the direction change-over valve, the supply flow rate from the hydraulic pump to the direction change-over valve comprising the supply flow rate from the second hydraulic pump to the direction change over valve at the subside supply oil passage;

wherein the operating amount of the hydraulic actuator manipulator comprises an operating amount of the large flow hydraulic actuator manipulator, when the operating amount of the large flow hydraulic actuator manipulator is less than a setting value, only a supply flow passing through the main side supply oil passage is configured to be supplied from first hydraulic pump to the direction change-over valve by closing the flow control valve; when the operating amount of the large flow hydraulic actuator's manipulator is not less than the setting value, the supply flow passing through the subside supply oil passage from the second hydraulic pump and the supply flow passing through the main side oil passage from the first hydraulic pump are configured to be joined together to be supplied to the direction change-over valve by opening the flow control valve;

wherein the discharge flow rate for the hydraulic actuator is a discharge flow rate for the large flow hydraulic actuator and is configured to be controlled based on the opening area of the discharge valve passage of the direction change-over valve; if the flow control valve is closed, the supply flow rate is configured to be controlled based on the opening area of the supply valve passage of the direction change-over valve; and if the flow control valve is opened, the supply flow rate is configured to be controlled based on the opening area of the flow control valve and the opening area of the supply valve passage to of the direction change-over valve;

wherein the target supply flow rate setting means provided to the control means sets up the target supply flow rate supplied from the first and second hydraulic pumps respectively to the large flow hydraulic actuator for each of the hydraulic pumps depending on the operating amount of the large flow hydraulic actuator's manipulator; the direction change-over valve's opening area setting means sets up the opening area of the supply/discharge valve passages for the direction change-over valve depending on the operating amount of the large flow hydraulic actuator's manipulator; the target differential pressure setting means sets up the target differential pressure between the second hydraulic pump pressure and the load pressure of the large flow hydraulic actuator; and the calculation means calculates the target opening area of the flow control valve for supplying the target supply flow rate from the second hydraulic pump to the large flow hydraulic actuator based on the target supply flow rate preset above, the opening area of the supply valve passage of the direction change-over valve, and the target differential pressure.

4. The hydraulic control system of claim 3, wherein when calculating the target opening area of the flow control valve, the calculation means calculates a differential pressure before and after the supply valve passage of the direction change-over valve based on the target supply flow rate from the first and second hydraulic pumps to the hydraulic actuator and the opening area of the supply valve passage of the direction change-over valve, further calculates the differential pressure before and after the flow control valve based on the differential pressure before and after the supply valve passage of the direction change-over valve and the target differential pressure, and additionally calculates the target opening area of the flow control valve based on a differential pressure before and after the flow control valve from the second hydraulic pump to the hydraulic actuator.

* * * * *